US012749793B2

(12) United States Patent
Kim et al.

(10) Patent No.: US 12,749,793 B2
(45) Date of Patent: Sep. 29, 2026

(54) MOUNTING APPARATUS FOR ANTENNA DEVICE ON LOOPTOP CONNER

(71) Applicant: KMW INC., Hwaseong-si (KR)

(72) Inventors: Duk Yong Kim, Yongin-si (KR); In Ho Kim, Yongin-si (KR); Kyo Sung Ji, Hwaseong-si (KR); Chi Back Ryu, Hwaseong-si (KR); Hee Kim, Osan-si (KR); Min Sik Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 30 days.

(21) Appl. No.: 18/542,903

(22) Filed: Dec. 18, 2023

(65) Prior Publication Data

US 2024/0128631 A1 Apr. 18, 2024

Related U.S. Application Data

(63) Continuation of application No. PCT/KR2022/008588, filed on Jun. 17, 2022.

(30) Foreign Application Priority Data

Jun. 18, 2021 (KR) ........................ 10-2021-0079657
Jun. 16, 2022 (KR) ........................ 10-2022-0073263

(51) Int. Cl.

| | |
|---|---|
| ***H01Q 1/12*** | (2006.01) |
| ***H01Q 1/00*** | (2006.01) |
| ***H01Q 1/24*** | (2006.01) |

(52) U.S. Cl.
CPC ........... *H01Q 1/1242* (2013.01); *H01Q 1/005* (2013.01); *H01Q 1/1221* (2013.01);
(Continued)

(58) Field of Classification Search
CPC ........ H01Q 1/005; H01Q 1/12; H01Q 1/1207; H01Q 1/1221; H01Q 1/1228;
(Continued)

(56) References Cited

FOREIGN PATENT DOCUMENTS

| | | |
|---|---|---|
| CN | 209249666 U | 8/2019 |
| CN | 209249680 U | 8/2019 |

(Continued)

OTHER PUBLICATIONS

International Search Report mailed Sep. 28, 2022 for International Application No. PCT/KR2022/008588 and its English translation.

(Continued)

*Primary Examiner* — Robert Karacsony

(57) ABSTRACT

The present invention relates to a mounting apparatus for an antenna device on a rooftop corner. In particular, the mounting apparatus is installed on a railing on a corner side of a rooftop, and includes: a floor support part which is disposed on the inner bottom surface of the railing of the roof top and has a part that extends upward in parallel to the railing; a pair of railing support parts extending horizontally from the upper portion of the floor support part toward the railing; and a mounting part which is coupled to the upper portion of the floor support part and has a top end on which an antenna device is mounted. Therefore, the present invention provides installation convenience and enables legal regulations to be met.

20 Claims, 11 Drawing Sheets

(52) U.S. Cl.
CPC .......... *H01Q 1/1228* (2013.01); *H01Q 1/125* (2013.01); *H01Q 1/246* (2013.01)

(58) Field of Classification Search
CPC .... H01Q 1/1235; H01Q 1/1242; H01Q 1/125; E04H 12/20; E04H 12/24
See application file for complete search history.

(56) References Cited

FOREIGN PATENT DOCUMENTS

| | | | | |
|---|---|---|---|---|
| JP | H01-41204 | Y2 | | 12/1989 |
| JP | H01-298802 | A | | 12/1989 |
| JP | 2003-70134 | A | | 3/2003 |
| JP | 4426043 | B2 | * | 3/2010 |
| JP | 2012-202016 | A | | 10/2012 |
| JP | 2013-005300 | A | | 1/2013 |
| JP | 6151390 | B1 | | 6/2017 |
| KR | 10-1431243 | B1 | | 8/2014 |
| KR | 10-1926109 | B1 | | 12/2018 |
| KR | 10-2020-0024091 | A | | 3/2020 |

OTHER PUBLICATIONS

European Search Report dated Jun. 12, 2025 from European Patent Office for Application No. 22825367.0.

* cited by examiner

[FIG. 1A]
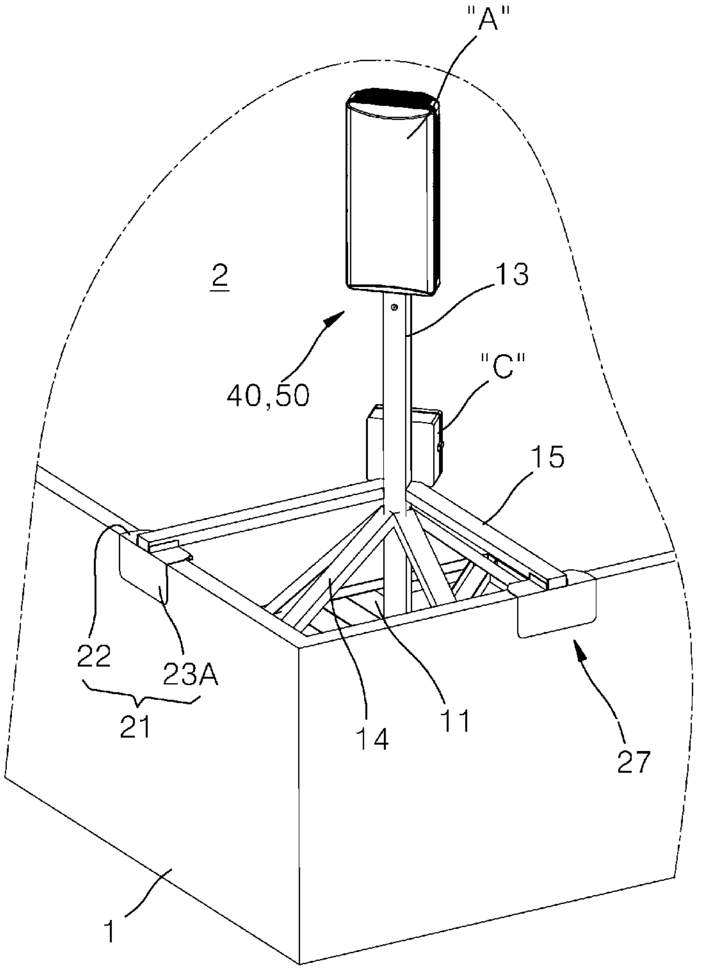

[FIG. 1B]
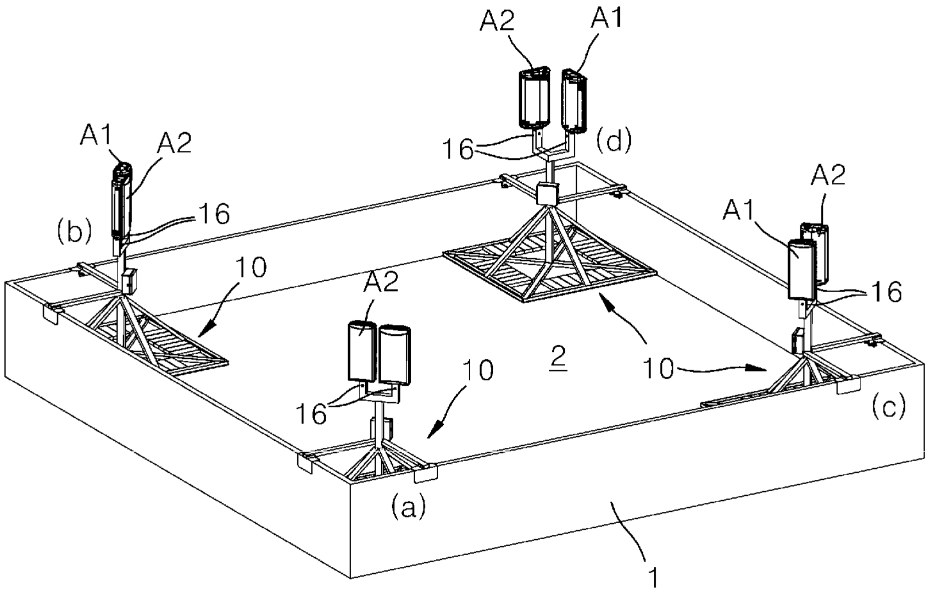

[FIG. 1C]
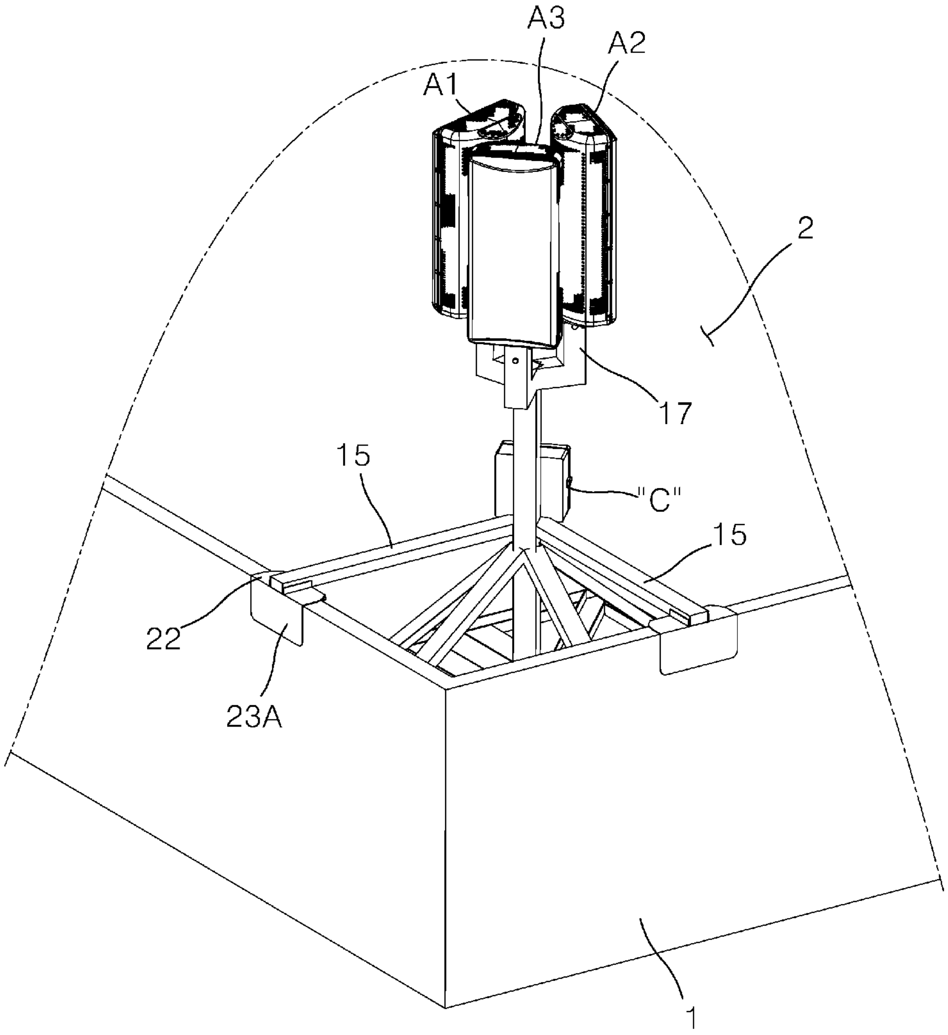

[FIG. 2]
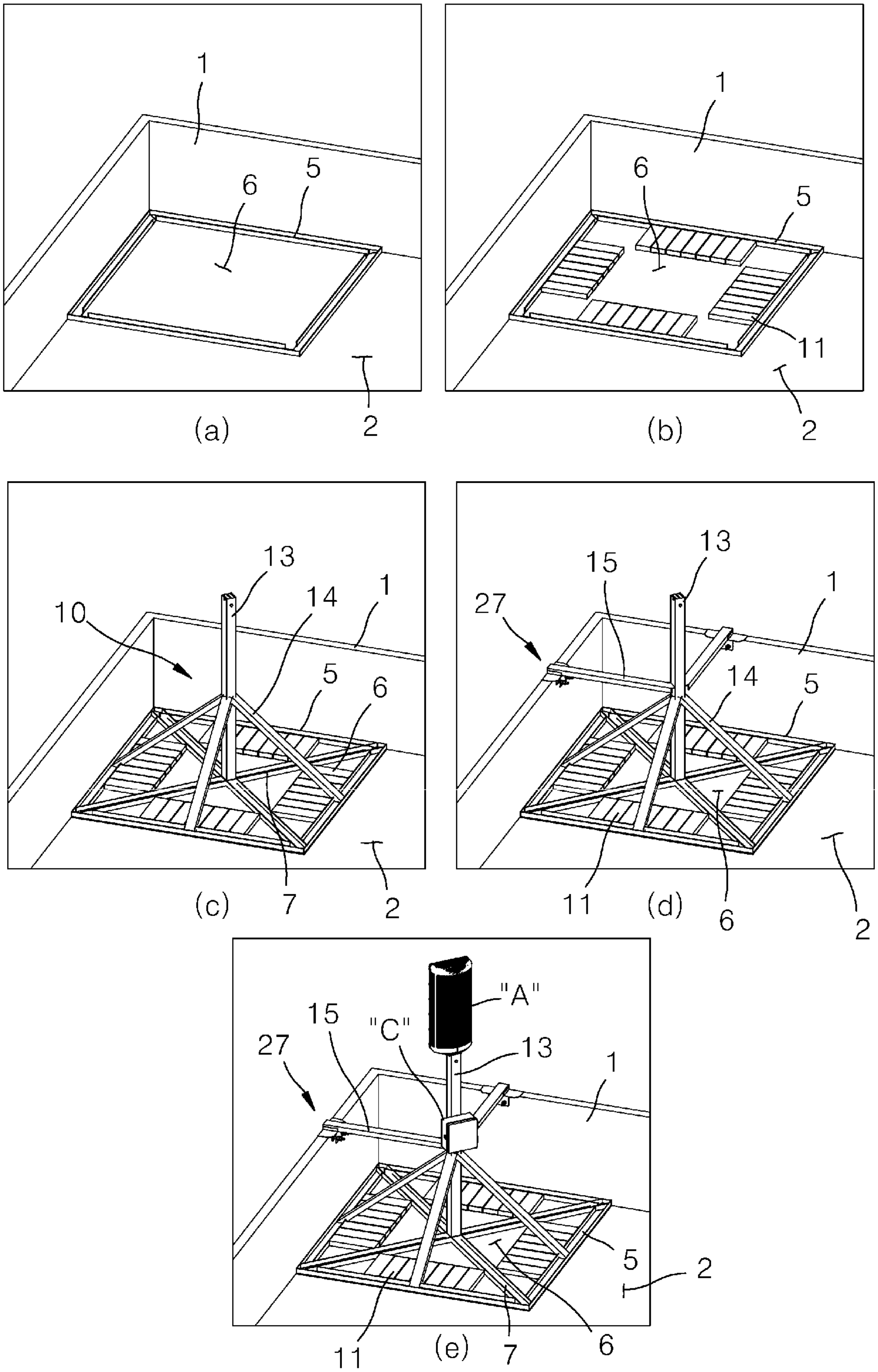

[FIG. 3A]
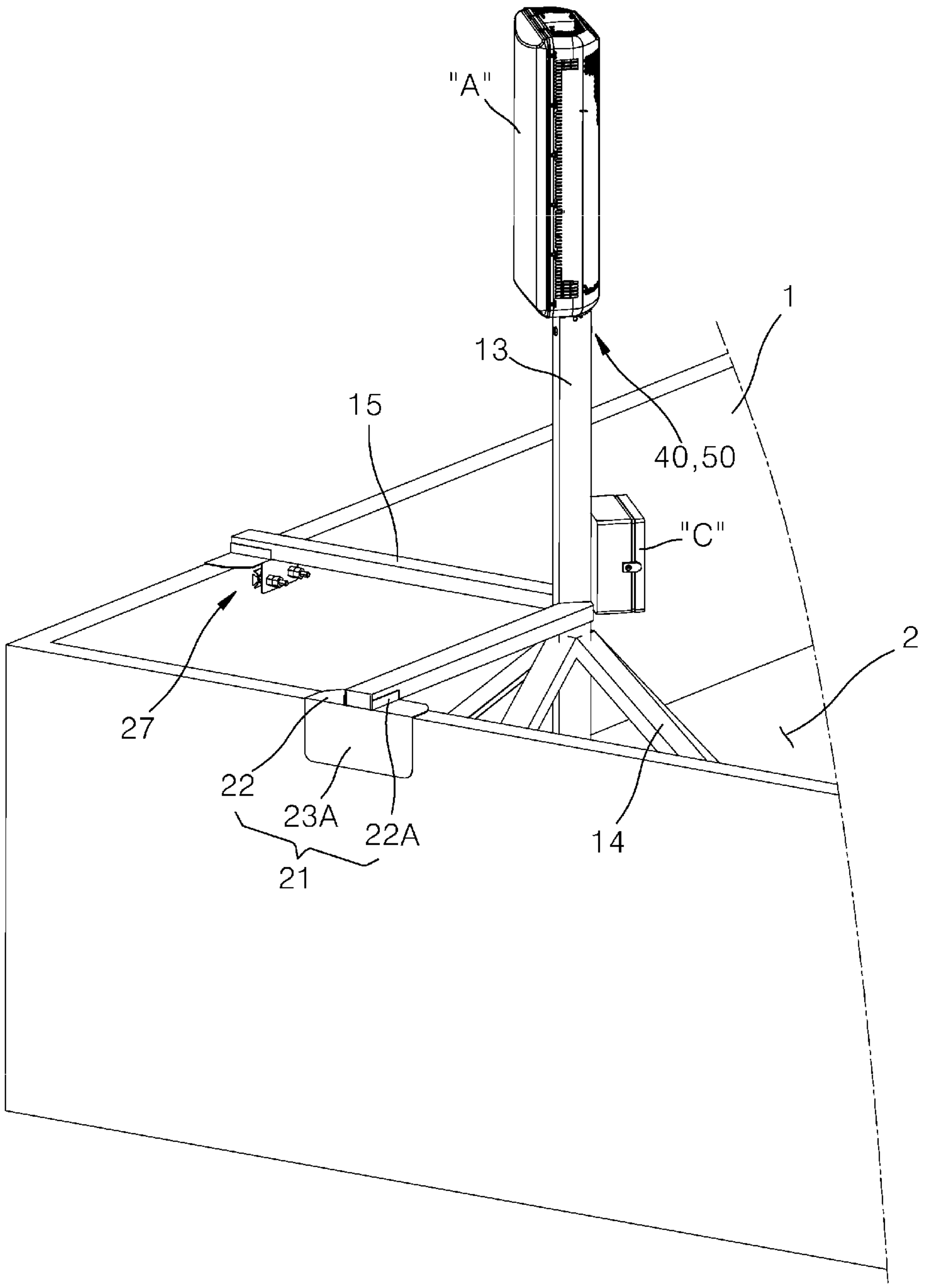

[FIG. 3B]
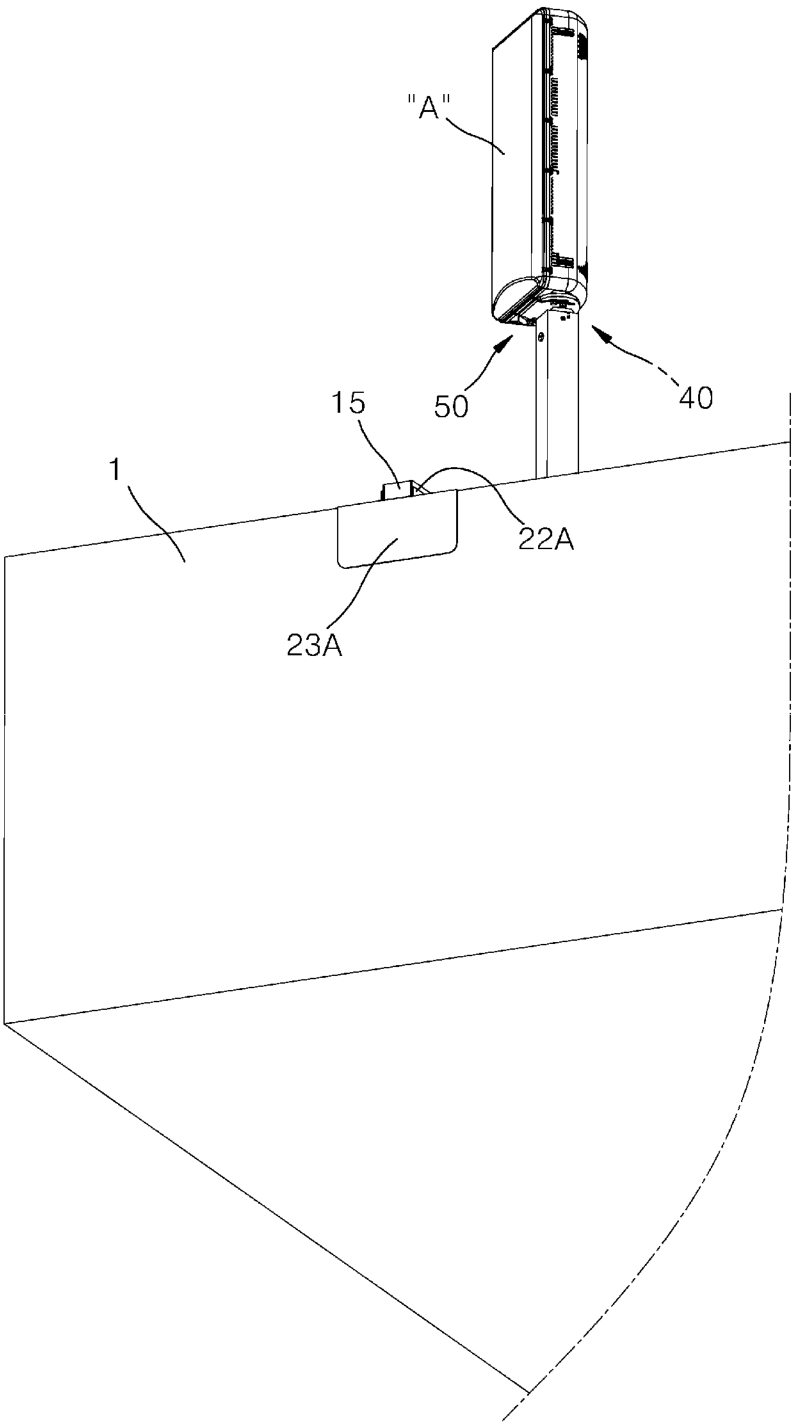

[FIG. 4]
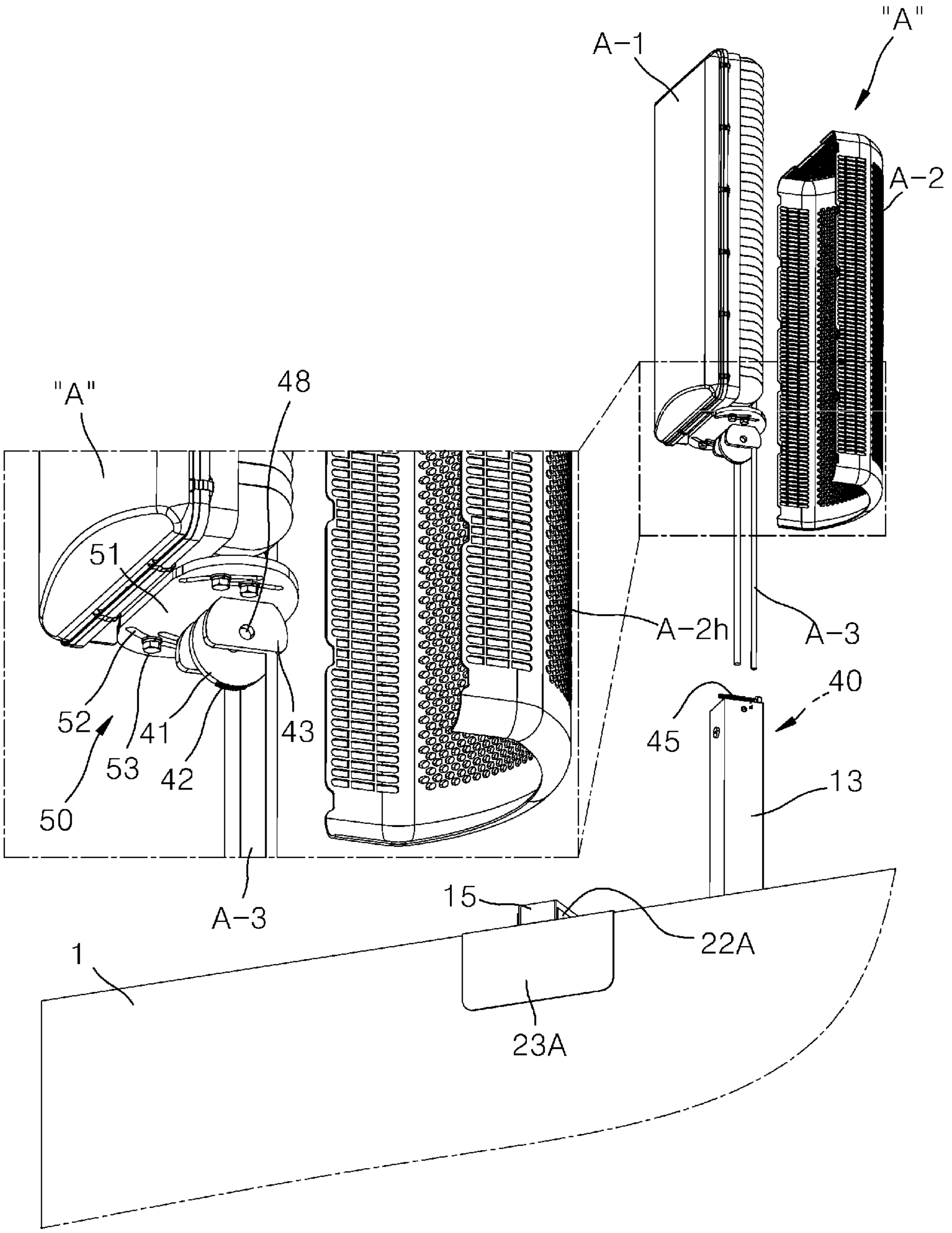

[FIG. 5]
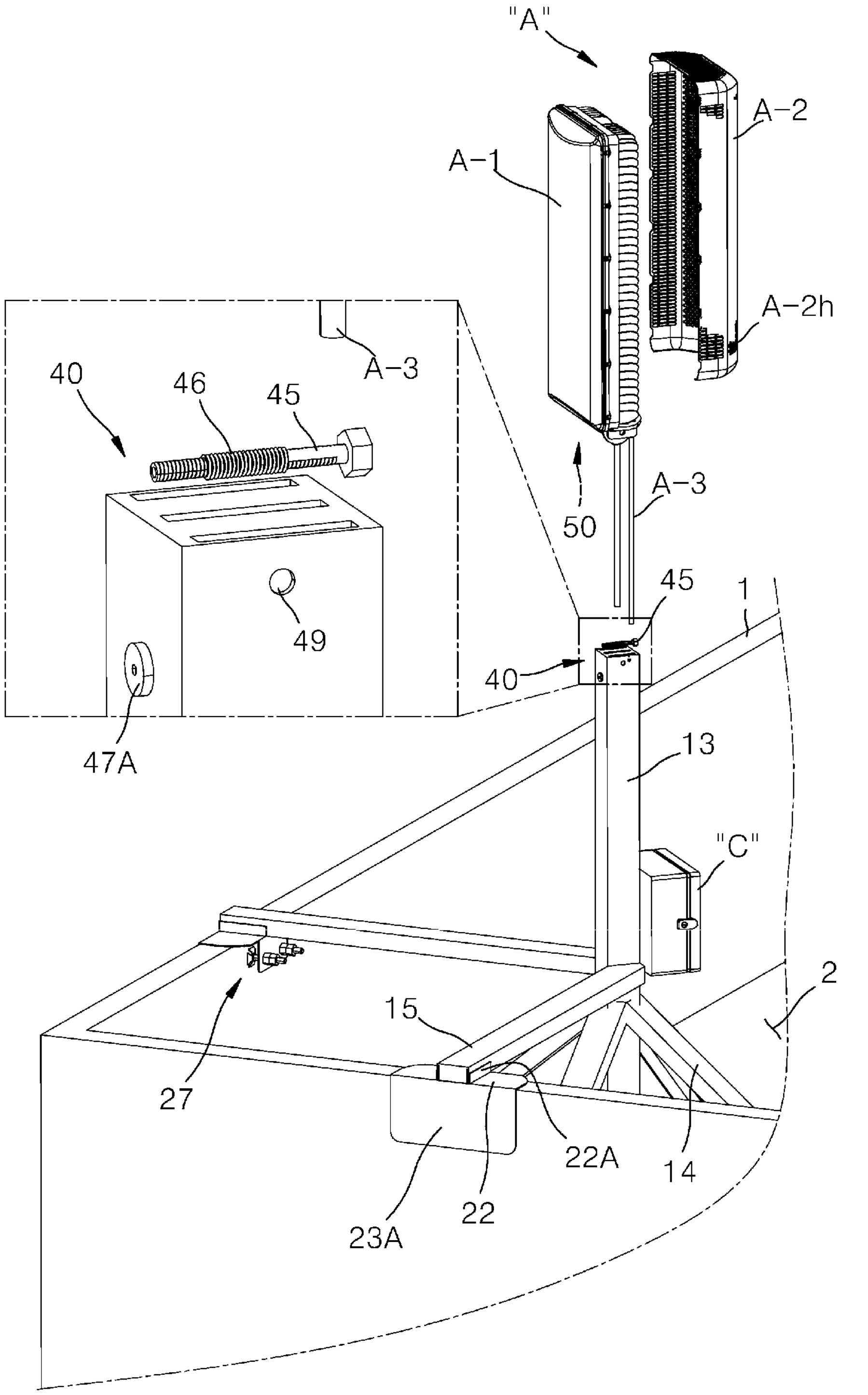

[FIG. 6]
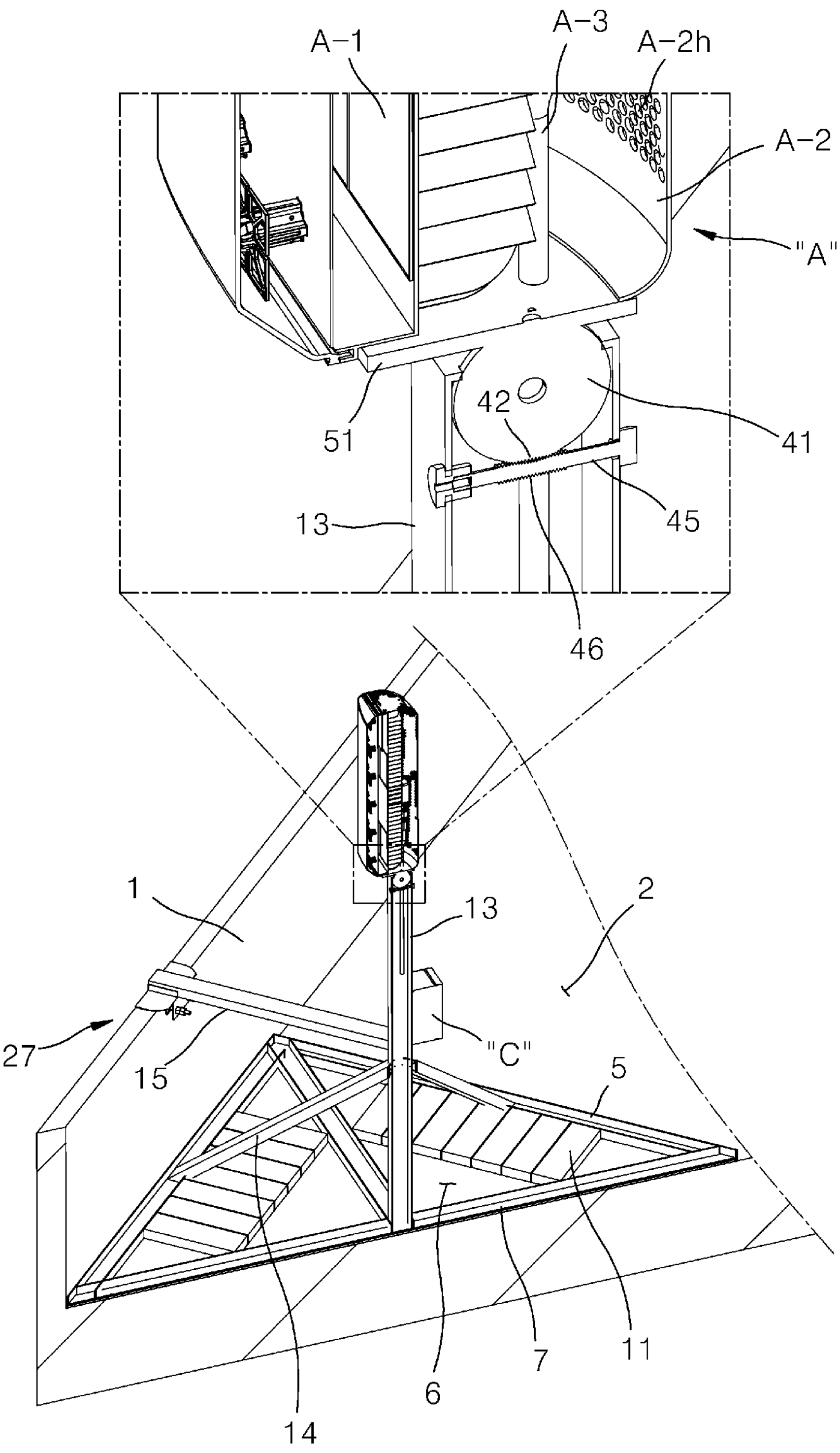

[FIG. 7]
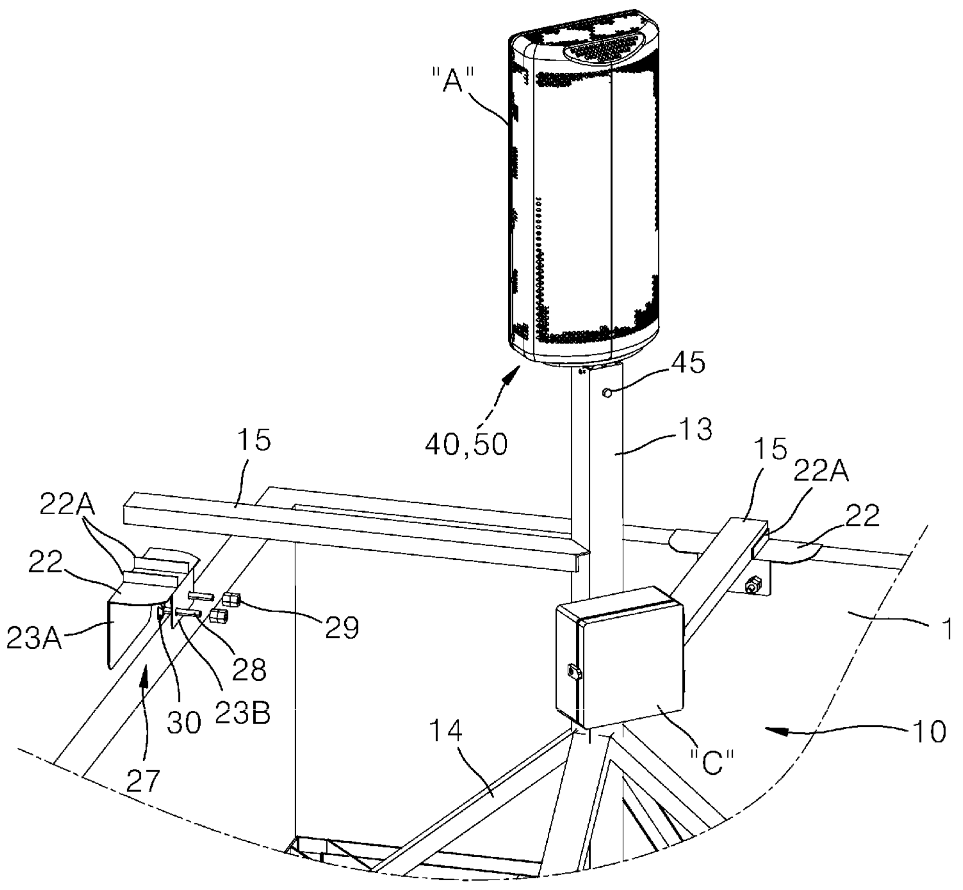

[FIG. 8]
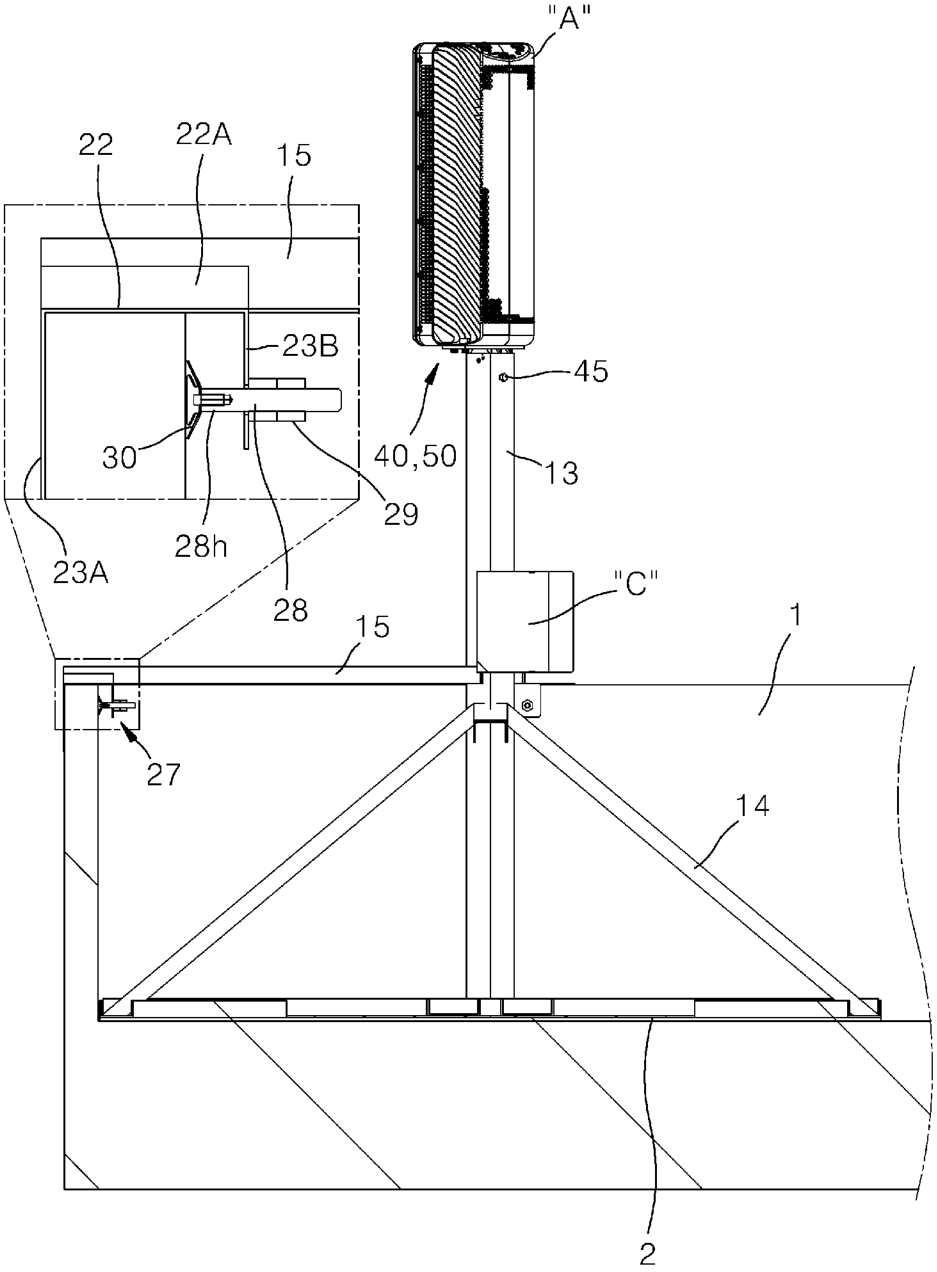

MOUNTING APPARATUS FOR ANTENNA DEVICE ON LOOPTOP CONNER

CROSS-REFERENCE TO RELATED APPLICATIONS

This application is a continuation application of International Application No. PCT/KR2022/008588, filed Jun. 17, 2022, which claims the benefit of Korean Patent Application Nos. 10-2021-0079657, filed Jun. 18, 2021; and 10-2022-0073263, filed Jun. 16, 2022, in the Korean Intellectual Property Office, the disclosures of which are incorporated herein in their entirety by reference.

TECHNICAL FIELD

The present disclosure relates to a mounting apparatus for an antenna device on a rooftop corner, and more particularly, to a mounting apparatus for an antenna device on a rooftop corner, which enables the antenna device to be easily installed without physical changes to the exterior of a building in a state where the installation height restrictions are satisfied, enables concealable installation of an optical cable so that the optical cable is not exposed to outside, facilitates directivity adjustment of the antenna device, and does not require many workers.

BACKGROUND ART

It is general to install an antenna for wireless communication in a high place where the surroundings are open for smooth transmission and reception with a wireless communication device that is located far away.

For this, the antenna is installed on a utility pole, an iron tower, or a building roof (rooftop), and especially in a downtown area, the antenna is often installed on the rooftop.

In this case, in order to install the antenna on the rooftop, a method is mainly used, in which a separate support pole for supporting the antenna in an upright state is installed on the building rooftop, and the antenna is fixed and installed onto the support pole.

In this case, it is often considered that the support pole is mainly fixed and installed onto the floor surface of the rooftop by using an anchor and the like. However, in this case, it is required to drill into the floor of the rooftop in order to fix the support pole, and this necessarily entails the damage to the building. In addition, in case of installing the antenna on the building roof (rooftop), large transport machinery, such as crane, is required due to the considerable weight of installation materials including the support pole, and thus the installation cost is greatly increased.

Further, in case that the antenna device is installed on the building rooftop, there is a problem in that various kinds of legal regulations of the corresponding installation country should be satisfied. For example, in order to install the antenna device on the building rooftop in a country, such as the US, it is required that the length in a diagonal direction of the antenna device does not exceed 3 ft so as to prevent accidents due to the collapse of the installation materials caused by strong wind pressure, and there are various kinds of regulations and diverse safety standards for operations of heavy equipment, such as large crane.

DISCLOSURE

Technical Problem

The present disclosure has been devised to solve the above problems, and an object of the present disclosure is to provide a mounting apparatus for an antenna device on a rooftop corner, which enables the antenna device to be easily installed on a corner handrail of the rooftop without changes to the exterior of a building in a state where the installation height restrictions in the corresponding installation country are satisfied.

Further, another object of the present disclosure is to provide a mounting apparatus for an antenna device on a rooftop corner, which facilitates installation of the antenna device on a top part of a holding pole, and enables concealable installation of a cable so as to prevent appearance beauty from deteriorating.

In addition, still another object of the present disclosure is to provide a mounting apparatus for an antenna device on a rooftop corner, which facilitates directivity adjustment of the antenna device.

The technical problems of the present disclosure are not limited to the above-described technical problems, and other unmentioned technical problems may be clearly understood by those skilled in the art from the following descriptions.

Technical Solution

A mounting apparatus for an antenna device on a rooftop corner according to an embodiment of the present disclosure includes: a bottom support part installed on a handrail on a corner side of a rooftop, disposed on a bottom surface on an inside of the handrail of the rooftop, and having a part extending upward in parallel to the handrail; a pair of handrail support parts extending horizontally from an upper part of the bottom support part toward the handrail, respectively; and a mounting part coupled to the upper part of the bottom support part and having a top on which the antenna device is mounted.

Here, the bottom support part includes: a plurality of heavy object blocks; a lower support part including a bottom support panel installed on the bottom surface of the rooftop so that the plurality of heavy object blocks are placed thereon, a border frame configured to form a border end part of the bottom support panel, and a diagonal connection frame cross-arranged to connect diagonal lines of the border frame; and an upper support part including a vertical support beam extending for a predetermined height from a crossing of the diagonal connection frame in a vertical direction in parallel to the handrail, and at least two inclined support beams each having a bottom connected to each middle part of the border frame and a top extending to be inclined from the bottom and connected to a middle part of the vertical support beam.

Further, the upper support part and the lower support part may be coupled to each other in any one of a welding coupling method and a bolting coupling method.

Further, each of the plurality of heavy object blocks may be provided with a metal material of 3 kg or less, and may be able to be individually seated on an upper surface of the bottom support panel between the border frame and the diagonal connection frame.

Further, any one of the vertical support beam and the at least two inclined support beams may be provided with a communicable inner space, and a wire installation port in which an external wire is inserted may be formed on a bottom part of any one of the at least two inclined support beams.

Further, the pair of handrail support parts may include at least two horizontal support beams horizontally extending from the middle part of the vertical support beam toward top parts of the handrail adjacent to each other, and extending from top parts of the inclined support beams.

Further, the pair of handrail support parts may further include: a seating panel part coupled to surround the top part of the handrail; and a vibration reduction part supported on an inner wall of the handrail.

Further, the at least two horizontal support beams may be seated and coupled onto the seating panel part so that front end parts thereof support a weight of the seating panel part in a gravity direction.

Further, the seating panel part may include: a top seating panel configured to be seated on the top part of the handrail; a handrail close contact panel extending to be bent from the top seating panel and configured to come in close contact with an outer wall of the handrail; and a handrail spacing panel extending to be bent from the top seating panel and disposed in parallel to be spaced apart for a predetermined distance from the inner wall of the handrail.

Further, the seating panel part may further include a horizontal beam mounting rib formed integrally with the top seating panel and configured to seat and surround a part of a front end part of the horizontal support beam.

Further, the vibration reduction part may include: a clamping bolt fastened to horizontally penetrate the handrail spacing panel disposed to be spaced apart from the inner wall of the handrail in parallel; a clamping nut assembled to the clamping bolt; and an elastic part provided on a front end part of the clamping bolt and configured to be elastically supported on the inner wall of the handrail.

Further, the elastic part may be provided as a disc spring screw-fastened to a spring fastening hole provided on the front end part of the clamping bolt, a diameter of the disc spring becoming larger from a front end center of the clamping bolt as getting closer toward the handrail.

Further, the mounting part may include: a tilting means configured to tilt and rotate a top part of the antenna device coupled to a top part of the vertical support beam in forward and backward direction centered on a bottom part thereof; and a steering means configured to steer and rotate both left and right end parts of the antenna device coupled to the top part of the vertical support beam in left and right direction.

Further, the steering means may include: a steering mounting panel configured to mediate coupling of the antenna device to the vertical support beam and to be tilted in interwork with a tilting rotation of the antenna device in forward and backward direction by the tilting means; a pair of left and right steering guide slots penetratingly formed along a predetermined steering rotation trajectory in up and down direction of the steering mounting panel; and a pair of left and right steering guide bolts configured to be fastened to a lower surface of the antenna device through penetrating lower parts of the pair of left and right steering guide slots.

Further, the steering mounting panel may be coupled to the top part of the vertical support beam through the tilting means.

Further, the tilting means may include: a hinge-fixed tilting panel formed integrally with a lower surface of the steering mounting panel provided to mediate the coupling of the antenna device to the vertical support beam, and having a part configured to form a left and right tilting axis inside the vertical support beam; a pair of tilting guide panels formed integrally with the lower surface of the steering mounting panel on both left and right sides of the tilting panel in parallel to the tilting panel; and a tilting adjustment bolt connected to a bottom part of the tilting panel and configured to adjust tilting of the tilting panel at a predetermined angle in forward and backward direction.

Further, worm wheel gear teeth may be formed on an outer periphery of the bottom part of the tilting panel, and a part of the outer periphery of the tilting adjustment bolt may be tooth-engaged with the worm wheel gear teeth; and the tilting adjustment bolt may be coupled to an inside of the top part of the vertical support beam horizontally in forward and backward direction.

Further, the tilting adjustment bolt may be provided with a tilting adjustment part configured to be exposed to outside by penetrating the vertical support beam corresponding to an inner direction of the handrail, and a tilting angle of the antenna device may be adjusted in accordance with a rotation amount of the tilting adjustment bolt through the tiling adjustment part.

Further, the tilting means may further include a tilting mounting panel formed with a tilting slot formed integrally with a top surface of the vertical support beam and penetrated by a bottom part of the tilting panel and a pair of tilting guide slots penetrated by a bottom part of the pair of tilting guide panels.

Further, a control box may be further installed on a middle area of the vertical support beam, and an optical cable that connects the control box and the antenna device with each other may be configured to penetrate up and down the steering mounting panel and to be installed in a concealable manner from the outside by a concealing cover installed on a rear part of the antenna device.

Advantageous Effects

According to the mounting apparatus for an antenna device on a rooftop corner according to an embodiment of the present disclosure, it is possible to easily install the antenna device on the handrail of the rooftop corner without changes to the exterior of a building in a state where the installation height restrictions in the corresponding country of installation are satisfied.

Further, according to the present disclosure, since it is possible to install the optical cable without being exposed to the outside, the appearance beauty can be improved.

In addition, according to the present disclosure, manual adjustment is easy in adjusting directivity of the antenna device.

DESCRIPTION OF DRAWINGS

FIGS. 1A to 1C are perspective views illustrating an installation state of various numbers of antenna devices using a mounting apparatus for an antenna device on a rooftop corner according to an embodiment of the present disclosure.

FIG. 2 is a perspective view explaining an installation process of an antenna device using a bottom support part and a mounting part among constitutions of a mounting apparatus for an antenna device on a rooftop corner according to an embodiment of the present disclosure.

FIGS. 3A and 3B are a downward perspective view and an upward perspective view illustrating an installation state of a single number of antenna devices at a corner of a rooftop.

FIGS. 4 and 5 are an exploded perspective view and a cross-sectional view illustrating a vibration reduction part among constitutions of a mounting apparatus for an antenna device on a rooftop corner according to an embodiment of the present disclosure.

FIG. 6 is a partial exploded perspective view and a partial enlarged view thereof illustrating a steering means of an antenna device.

FIGS. 7 and 8 are a partial exploded perspective view and a partial enlarged view thereof, and a cutaway perspective view illustrating a tilting means of an antenna device.

EXPLANATION OF SYMBOLS

1: handrail 2: bottom surface
5: border frame 6: bottom support panel
7: diagonal connection frame 10: bottom support part
11: heavy object block 13: vertical support beam
14: inclined support beam 15: horizontal support beam
15, 21, 27: handrail support part 21: seating panel part
22: top seating panel 22A: horizontal beam mounting rib
23A: handrail close contact panel 23B: handrail spacing panel
27: vibration reduction part 28: clamping bolt
29: clamping nut 30: elastic part
40: tilting means 41: tilting panel
42: worm wheel gear teeth 43: tilting guide panel
44: tilting mounting panel 44A: tilting slot
44B: tilting guide slot 45: tilting adjustment bolt
46: worm gear teeth 47A: hinge installation part
49: tilting axis hole 50: steering means
51: steering mounting panel 52: steering guide slot
53: steering guide bolt

MODE FOR INVENTION

Hereinafter, a mounting apparatus for an antenna device on a rooftop corner according to an embodiment of the present disclosure will be described in detail with reference to the exemplary drawings.

In adding reference numerals to constituent elements in the drawings, it is to be noted that the same constituent elements have the same reference numerals as much as possible even if they are represented in different drawings. Further, in explaining embodiments of the present disclosure, the detailed explanation of related known constitutions or functions will be omitted if it is determined that the detailed explanation interferes with understanding of the embodiments of the present disclosure.

The terms, such as "first, second, A, B, (a), and (b)", may be used to describe constituent elements of embodiments of the present disclosure. The terms are only for the purpose of discriminating one constituent element from another constituent element, but the nature, the turn, or the order of the corresponding constituent elements is not limited by the terms. Further, unless otherwise defined, all terms (including technical and scientific terms) used herein have the same meanings as those commonly understood by those ordinary skilled in the art to which the present disclosure belongs. The terms that are defined in a generally used dictionary should be interpreted as meanings that match with the meanings of the terms from the context of the related technology, and they are not interpreted as an ideal or excessively formal meaning unless clearly defined in the present disclosure.

FIGS. 1A to 1C are perspective views illustrating an installation state of various numbers of antenna devices using a mounting apparatus for an antenna device on a rooftop corner according to an embodiment of the present disclosure. FIG. 2 is a perspective view explaining an installation process of an antenna device using a bottom support part and a mounting part among constitutions of a mounting apparatus for an antenna device on a rooftop corner according to an embodiment of the present disclosure. FIGS. 3A and 3B are a downward perspective view and an upward perspective view illustrating an installation state of a single number of antenna devices at a corner of a rooftop.

As referenced in FIGS. 1 to 3B, a mounting apparatus for an antenna device on a rooftop corner according to an embodiment of the present disclosure includes: a bottom support part 10 installed on a handrail 1 on a corner side of a rooftop, disposed on a bottom surface 2 on an inside adjacent to the handrail of the rooftop, and having a part extending upward in parallel to the handrail 1; a pair of handrail support parts 15, 21, and 27 extending horizontally from an upper part of the bottom support part 10 toward any one of the handrails 2 adjacent to each other; and a mounting part 40 and 50 coupled to the upper part of the bottom support part 10 and having a top on which the antenna device A is mounted.

Here, as for the antenna device A, as referenced in FIG. 1A, a single number of antenna device A may be coupled to an upper part of a single number of vertical support beam 13 to be described above, or as referenced in FIG. 1B, two antenna devices A1 and A2 may be coupled to the upper parts of the vertical support beam 13 through two branched antenna mounting beams 16, or as referenced in FIG. 1C, three antenna devices A1, A2, and A3 may be coupled to the upper part of the vertical support beam 13 through three branched antenna mounting beams 17.

As referenced in FIG. 1A, in case that the single number of antenna device A is coupled to the upper part of the vertical support beam 13, it is preferable that a front of the antenna device A is installed toward a corner side of the handrail 1 of the rooftop so that beamforming for a building outside direction is advantageous.

Further, as referenced in FIG. 1B, in case that two antenna devices A1 and A2 are coupled to two branched antenna mounting beams 16, the fronts of the antenna devices A1 and A2 may be installed in the same direction (refer to (a) of FIG. 1B); or the fronts of the antenna devices A1 and A2 may be installed in the opposite directions, that is, any one antenna device A1 may be installed to face the corner side of the handrail 1 of the rooftop and the other antenna device A2 may be installed to face an inside of the rooftop (refer to (b) of FIG. 1B); or the fronts of the antenna devices A1 and A2 may be installed to face different directions, that is, to face the directions at an angle of 45 degrees against the handrail 1 (refer to (c) of FIG. 1B); or the fronts of the antenna devices A1 and A2 may be installed to face different directions, that is, to face the directions at an orthogonal angle against the handrail 1 (refer to (d) of FIG. 1B).

Further, as referenced in FIG. 1C, in case that three antenna devices A1, A2, and A3 are coupled to three branched antenna mounting beams 17, the three antenna devices A1, A2, and A3 can cover the forward angle of 120 degrees each within the omnidirectional beamforming angle range, and thus there is an advantage that the antenna devices A1, A2, and A3 can be disposed on the handrail 1 of the rooftop corner so that the fronts of the antenna devices face proper directions.

In addition, as referenced in FIGS. 3A and 3B, almost all constituent elements of the bottom support part 10 excluding a top part of the vertical support beam 13 and the antenna device A installed thereon are installed with heights which are lower than or roughly the same as the top height of the handrail 1 (in case of handrail support part 15, 21, and 27), and thus there is an advantage that easy installation is possible within the range that does not deteriorate the beauty of the building exterior when observed from an outer lower part of the handrail 1.

Meanwhile, as referenced in FIG. 2, the bottom support part 10 may include: a plurality of heavy object blocks 11; a lower support part 5, 6, and 7 disposed to be seated on an inner bottom surface 2 adjacent to the handrail 1 on the corner of the rooftop; and an upper support part 13 and 14 disposed on an upper part of the lower support part 5, 6, and 7.

Here, for example, if the weight of the antenna device A is 30 kg, the plurality of heavy object blocks 11 may be provided as 10 or more heavy object blocks each having 30 kg so as to firmly support the weight more than 10 times the weight of the antenna device A on the bottom surface 2 on the inside of the rooftop without floating of the antenna device A. However, the number of heavy object blocks 11 is not necessarily limited thereto, and more or less than 10 heavy object blocks 11 can also be provided in consideration of the installation environment of the installed rooftop, such as wind volume and speed.

In particular, if the weight of each heavy object block 11 is 30 kg or less, even one worker can transport the heavy object block 11 by using the elevator or stairs in a building without the necessity of mobilizing heavy equipment, such as crane, and thus the installation cost and manpower can be saved.

The mounting apparatus for an antenna device on a rooftop corner according to an embodiment of the present disclosure has been designed so that the weight of not only the plurality of heavy object blocks 11 but also individual constituent elements, such as the bottom support part 10 and the handrail support part 15, 21, and 27 belonging to other installation materials, does not exceed 30 kg so that it can be sufficiently transported using only one worker's manpower.

Further, as illustrated in FIG. 2, the plurality of heavy object blocks 11 may be arranged in a long line so as to form one layer long in a predetermined direction on an upper part of a bottom support panel 6.

More specifically, as referenced in (b) of FIG. 2, the plurality of heavy object blocks 11 may be provided of a metal material of 30 kg or less, and can be individually seated on an upper surface of the bottom support panel 6 between a border frame 5 and a diagonal connection frame 7 among the constitutions of a lower support part 5, 6, and 7 to be described later.

In addition, although not illustrated in the drawing, the plurality of heavy object blocks 11 may be manufactured with certain standards, and may be formed to be able to be stably stacked in the form that fits together like a block toys of LEGO Company. In this case, handle parts may be provided on the plurality of heavy object blocks 11 for stable transport by one installer, and the handle parts may be formed without interference during stacking of the plurality of heavy object blocks 11.

Meanwhile, the bottom support part 10 may serve to fix the antenna device A onto a top part of the support beam 13 with a height that satisfies the height regulations of the antenna device A. Here, the height of the antenna device A can be adjusted by changing the installation location of the mounting part 40 and 50 against the vertical support beam 13 to be described later.

More specifically, as referenced in (a) to (c) of FIG. 2, the lower support part 5, 6, and 7 of the bottom support part 10 may include a bottom support panel 6 installed on the bottom surface 2 of the rooftop so that the plurality of heavy object blocks 11 are placed thereon, a border frame 5 configured to form a border end part of the bottom support panel 6, and a diagonal connection frame 7 cross-arranged to connect diagonal lines of the border frame 5.

The bottom support panel 6 may be provided in the form of a roughly rectangular (or square) steel plate, and the border frame 5 may be provided with a rigid frame material connected to the border part of the bottom support panel 6 in any one of a welding coupling method and a bolting coupling method. The diagonal connection frame 7 may be provided with a rigid frame material cross-arranged to connect corner parts facing each other among corners of the bottom support panel 6 that is a rectangular (or square) steel plate with diagonal lines.

Here, although not illustrated in the drawing, a plurality of levelers configured to adjust balancing with respect to the bottom surface 2 of the rooftop may be provided on the lower part of the bottom support panel 6 or the border frame 5. After the lower support part 5, 6, and 7 are installed and assembled on the bottom surface 2 of the rooftop, the plurality of levelers may serve to help safe fixing and installation of the handrail support part 15, 21, and 27 on the handrail 1 on the corner of the rooftop after the balancing adjustment using the levelers.

Meanwhile, as referenced in (c) of FIG. 2, the upper support part 13 and 14 among the constitutions of the bottom support part 10 may include a vertical support beam 13 extending for a predetermined height from a crossing of the diagonal connection frame 7 in a vertical direction in parallel to the handrail 1, and at least two inclined support beams 14 each having a bottom connected to each middle part of the border frame 5 and a top extending to be inclined from the bottom and connected to a middle part of the vertical support beam 13.

The bottom of the inclined support beam 14 is connected to each middle part of the border frame 5, and in case that four border frames 5 are provided to correspond to the number of sides of the rectangular bottom support panel 6, it is preferable that the number of inclined support beams 14 is also set to 4.

Meanwhile, the term "middle part" used herein does not mean only the accurately physically middle between both ends of the indicated constitution, but should be interpreted to include all of the remaining parts excluding one end part and the other end part in a state where the indicated constitution is divided into three equal parts.

Here, the upper support part 13 and 14 and the lower support part 5, 6, and 7 are provided with the rigid frame material (steel plate material) in all, and may be coupled to each other in any one of a welding coupling method and a bolting coupling method as one of methods suitable to the rigid frame material (or steel plate material) coupling methods.

Meanwhile, although not illustrated in detail in the drawing, any one of the vertical support beam 13 and the at least two inclined support beams 14 may be provided with a communicable inner space, and a wire installation port (not illustrated) in which an external wire is inserted may be formed on a bottom part of any one of the at least two inclined support beams 14.

As described above, since the external wire is inserted and installed from the bottom surface 2 adjacent to the handrail 1 of the rooftop through the wire installation port of the inclined support beam 14, and is installed in a concealable manner to extend toward the installed antenna device A through the inner spaces of the inclined support beam 14 and the vertical support beam 13, it is possible to simplify the wiring design of the complicated external wire and to prevent the appearance beauty of the building from deteriorating due to the external wire.

Meanwhile, as referenced in (d) and (e) of FIG. 2, a pair of handrail support parts 15, 21, and 27 may include at least two horizontal support beams 15 horizontally extending from the middle part of the vertical support beam 13 toward top parts of the handrails 2 adjacent to each other, and extending from the vertical support beam 13 corresponding to the top part of the inclined support beam 14.

It is preferable that the horizontal support beams 15 are provided one by one with respect to two adjacent handrails 1 having corners of 90 degrees, respectively, so that front end parts thereof are orthogonally seated by 90 degrees with respect to the two adjacent handrails 1.

In this case, the at least two horizontal support beams 15 may be seated and coupled onto the seating panel part 21 so that the front end parts thereof support the weight of the seating panel part 21 to be described later in a gravity direction. This will be described in more detail later.

FIGS. 4 and 5 are an exploded perspective view and a cross-sectional view illustrating a vibration reduction part among constitutions of a mounting apparatus for an antenna device on a rooftop corner according to an embodiment of the present disclosure.

As referenced in FIGS. 4 and 5, the pair of handrail support parts 15, 21, and 27 may further include: a seating panel part 21 coupled to surround the top part of the handrail 1; and a vibration reduction part 27 supported on an inner wall of the handrail 1.

Here, as referenced in FIGS. 4 and 5, the seating panel part 21 may include: a top seating panel 22 configured to be seated on the top part of the handrail 1; a handrail close contact panel 23A extending to be bent from the top seating panel 22 and configured to come in close contact with an outer wall of the handrail 1; and a handrail spacing panel 23B extending to be bent from the top seating panel 22 and disposed in parallel to be spaced apart for a predetermined distance from the inner wall of the handrail 1.

The handrail close contact panel 23A may be formed so that the end part of the top seating panel 22 in an outward direction of the handrail 1 is orthogonally bent downward, and the handrail spacing panel 23B may be formed so that the end part of the top seating panel 22 in an inward direction of the handrail 1 is orthogonally bent downward.

The handrail close contact panel 23A of the seating panel part 21 may come in close contact with the outer wall of the handrail 1 and may have an area enough to endure the shaking (or gap) of the antenna device A caused by an external force, such as wind pressure, that is transferred to the antenna device A.

Accordingly, the handrail close contact panel 23A may be formed with an area which is larger than the area of the handrail spacing panel 23B that is enough to install the vibration reduction part 27 to be described later thereon.

The seating panel part 21 composed of the above-described constitution may be pre-assembled and fixed by the vibration reduction part 27 to be described later in a state where the horizontal support beam 15 is seated to surround the top part of the handrail 1 corresponding to an area that is orthogonal to the handrail 1, and the front end part of the horizontal support beam 15 may be fixed to the upper surface part.

For this, as referenced in FIGS. 4 and 5, the seating panel part 21 may further include a pair of horizontal beam mounting ribs 22A formed integrally with the top seating panel 22 and configured to seat and surround a part of the front end part of the horizontal support beam 15.

The pair of horizontal beam mounting ribs 22A may orthogonally extend upward with respect to the upper surface part of the top seating panel 22, and may be disposed in parallel to correspond to the length in the width direction of the horizontal support beam 15.

Between the pair of horizontal beam mounting ribs 22A, the front end part of the horizontal support beam 15 may be seated, and although not illustrated, the front end part of the horizontal support beam 15 may be firmly fixed to the horizontal beam mounting rib 22A through a welding coupling method and a bolting coupling method.

Meanwhile, as referenced in FIGS. 4 and 5, the vibration reduction part 27 may include: a clamping bolt 28 fastened to horizontally penetrate the handrail spacing panel 23B; a clamping nut 29 assembled to the clamping bolt 28; and an elastic part 30 provided on a front end part of the clamping bolt 28 and configured to be elastically supported on the inner wall of the corner side of the handrail 1.

Here, the elastic part 30 may be provided as a disc spring screw-fastened to a spring fastening hole (the reference numeral thereof is not denoted) provided on the front end part of the clamping bolt 28, the diameter of the disc spring becoming larger from a front end center of the clamping bolt 28 as getting closer toward the handrail 1.

As referenced in FIGS. 4 and 5, according to the vibration reduction part 27 composed of the above-described constitution, male threads (not illustrated) for the clamping nut 29 to be fastened thereto may be formed on an outer periphery of the clamping bolt 28, and after the clamping bolt 28 is penetratingly fastened to the handrail spacing panel 21*a*, the clamping nut 29 may be fastened to determine the tightening force in a screw connection method, and elastic part 30 may also be fastened to a screw fastening hole side provided with female threads on the front end part of the clamping bolt 28 in the screw connection method.

The vibration reduction part 27 serves to make the handrail close contact panel 23A and the elastic part 30 be firmly and tightly clamped onto the inner wall and the outer wall of the handrail 1, respectively, when the clamping nut 29 is tightened.

Here, since the elastic part 30 is provided to be elastically supported on the inner wall of the handrail 1, the vibration reduction part 27 may also serve to reduce external vibrations such as floating or shaking of the antenna device A caused by wind. That is, in case that the antenna device is installed on the handrail 1 constituting the corner of the rooftop, the antenna device A is subject to frequent wind pressure by usually strong winds, and the vibration reduction part 27 has the advantage of reducing the external vibrations and being able to block noise occurrence due to the vibrations in advance because the elastic part 30 is configured to be elastically supported on the handrail 1 against the floating or shaking of all constituent elements of the bottom support part 10 and the mounting part 40 and 50 including the antenna device A.

FIG. 6 is a partial exploded perspective view and a partial enlarged view thereof illustrating a steering means of an antenna device, and FIGS. 7 and 8 are a partial exploded perspective view and a partial enlarged view thereof, and a cutaway perspective view illustrating a tilting means of an antenna device.

As referenced in FIGS. 6 to 8, the antenna device A may be mounted on the top part of the vertical support beam 13 through the mounting part 40 and 50 in tilting-rotatable and steering-rotatable manner.

Here, as referenced in FIGS. 6 to 8, the mounting part 40 and 50 may include: a tilting means 40 configured to tilt and rotate the top part of the antenna device A coupled to the top part of the vertical support beam 13 in forward and backward direction centered on the bottom part of the antenna device A; and a steering means 50 configured to steer and rotate both left and right end parts of the antenna device A coupled to the top part of the vertical support beam 13 in left and right direction.

The steering means 50 may include: a steering mounting panel 51 configured to mediate the coupling of the antenna device A onto the vertical support beam 13 and to be tilted in interworking with the tilting rotation of the antenna device A in forward and backward direction by the tilting means 40; a pair of left and right steering guide slots 52 penetratingly formed along a predetermined steering rotation trajectory in up and down direction of the steering mounting panel 51; and a pair of left and right steering guide bolts 53 configured to be fastened to a lower surface of the antenna device A through penetrating lower parts of the pair of left and right steering guide slots 52.

Here, the steering mounting panel 51 may be coupled to the top part of the vertical support beam 13 through a tilting rotation axis (not illustrated) that penetrates a tilting panel 41 and a tilting guide panel 43 of the tilting means 40 to be described later in left and right direction.

Meanwhile, as referenced in FIGS. 6 to 8, the tilting means 40 may include: a hinge-fixed tilting panel 41 formed integrally with a lower surface of the steering mounting panel 51 provided to mediate the coupling of the antenna device A to the vertical support beam 13, and having a part configured to form a tilting rotation axis inside the vertical support beam 13; a pair of tilting guide panels 43 formed integrally with the lower surface of the steering mounting panel 51 on both left and right sides of the tilting panel 41 in parallel to the tilting panel 41; and a tilting adjustment bolt 45 connected to a bottom part of the tilting panel 41 and configured to adjust tilting of the tilting panel 41 at a predetermined angle in forward and backward direction.

Here, both end parts of the tilting rotation axis (not illustrated) may be hinge-fixed to a tilting axis hole 49 formed on both left and right surfaces of the top part of the vertical support beam 13.

In addition, worm wheel gear teeth 42 may be formed on an outer periphery of the bottom part of the tilting panel 41, and worm gear teeth 46 being tooth-engaged with the worm wheel gear teeth 42 of the tilting panel 41 may be formed on a part of the outer periphery of the tilting adjustment bolt 45.

The tilting adjustment bolt 45 may be coupled to an inside of the top part of the vertical support beam 13 horizontally in forward and backward direction.

Further, the tilting adjustment bolt 45 may be provided with a tilting adjustment part (the reference numeral thereof is not denoted) configured to be exposed to the outside by penetrating the vertical support beam 13 corresponding to an inner direction of the handrail, and the tilting angle of the antenna device A may be adjusted in accordance with the rotation amount of the tilting adjustment bolt 45 through the tilting adjustment part.

More specifically, the tilting adjustment bolt 45 may have a front end part that is fixed to be rotatably supported on a hinge installation part 47A provided on the front end part of the vertical support beam 13, and a tilting adjustment part of a rear end part of the tilting adjustment bolt 45 may be installed to be exposed through penetrating the rear end part of the vertical support beam 13.

Here, a worker can adjust the tilting rotation angle of the antenna device A by setting the rotation amount of the tilting adjustment bolt 45 by using a predetermined adjustment tool that can rotate a head part (i.e., tilting adjustment part) of the bolt.

Meanwhile, the tilting means 40 may further include a tilting mounting panel 44 formed with a tilting slot 44A formed integrally with the top surface of the vertical support beam 13 and penetrated by the bottom part of the tilting panel 41 and a pair of tilting guide slots 44B penetrated by the bottom part of the pair of tilting guide panels 43.

Here, since the tilting means 40 and the steering means 50 are disposed on the top part of the vertical support beam 13 which is relatively easy for an installation worker to access, they can provide the advantage for the installation worker or a manager of the antenna device A to be able to easily adjust the directivity of the antenna device A by using the tilting means 40 and the steering means 50.

Meanwhile, a control box C may be further installed in the middle area of the vertical support beam 13, and an optical cable A-3 that connects the control box C and the antenna device A with each other may be configured to penetrate up and down the steering mounting panel 51 and to be installed in a concealable manner from the outside by a concealing cover A-2 installed on the rear part of the antenna device A.

Here, the concealing cover A-2 may serve to prevent the worker or an unspecified person who can access the rooftop from coming in contact with a plurality of heat sink fins (the reference numeral thereof is not denoted) formed on the rear part of the antenna device A for system heat dissipation and getting burned, and at the same time, may serve not to spoil the appearance of a building including the antenna device A by making the optical cable A-3 be not exposed to the outside as described above.

On the concealing cover A-2, a plurality of air flowing holes A-2*h* capable of making an outdoor air flow therein may be formed to facilitate heat transfer to the outdoor air through the plurality of heat sink fins.

Further, the bottom of the concealing cover A-2 and the rear surface of the antenna device A may be disposed to be spaced apart for a predetermined distance from each other, or a through-installation port may be provided between them for installation of the optical cable A-3 therethrough.

As described above, according to the mounting apparatus for an antenna device on a rooftop corner according to an embodiment of the present disclosure, since the installation of the antenna device is possible through easy height adjustment of the bottom support part 10 even without shape change of the rooftop and easy clamping and bolting coupling against the handrail 1 on the corner side of the rooftop, the ease of installation can be improved, and various kinds of regulations in the country of installation can be satisfied.

Further, according to an embodiment of the mounting apparatus for an antenna device on a rooftop corner according to the present disclosure, it is possible to install the plurality of antenna devices A and A1 to A3 by easily utilizing the spaces of the handrail 1 on the corner of the rooftop generally corresponding to surplus spaces, and the installation convenience can be improved by separating and coupling the weights of respective constitutions so as to be able to be transported by one worker or installer.

As above, a mounting apparatus for an antenna device on a rooftop corner according to an embodiment of the present disclosure has been described in detail with reference to the accompanying drawings. However, embodiments of the present disclosure are not necessarily limited to the above-described embodiment, but it will be apparent that various modifications and implementation within an equal scope are possible by those of ordinary skill in the art to which the present disclosure pertains. Accordingly, the true scope of the present disclosure should be determined by the appended claims.

INDUSTRIAL APPLICABILITY

The present disclosure provides a mounting apparatus for an antenna device on a rooftop corner, which enables the antenna device to be easily installed on a handrail of the rooftop corner without changes to the exterior of a building in a state where the installation height restrictions are satisfied in the corresponding installation country, facilitates installation of the antenna device on a top part of a holding pole, and enables concealable installation of a cable so as to prevent appearance beauty of the antenna device from deteriorating.

The invention claimed is:

1. A mounting apparatus for an antenna device on a rooftop corner, the mounting apparatus comprising:

a bottom support part installed on a handrail on a corner side of a rooftop, disposed on a bottom surface on an inside of the handrail of the rooftop, and having a part extending upward in parallel to the handrail;

a pair of handrail support parts extending horizontally from an upper part of the bottom support part toward the handrail, respectively; and a mounting part coupled to the upper part of the bottom support part and having a top configured for mounting the antenna device, wherein the bottom support part includes:

a border frame and a diagonal connection frame cross-arranged to connect diagonal lines of the border frame, and at least two inclined support beams each having a bottom connected to a middle part of the border frame and a top extending to be inclined from the bottom and connected to a middle part of the part extending upward in parallel to the handrail.

2. A mounting apparatus for an antenna device on a rooftop corner, the mounting apparatus comprising:

a bottom support part installed on a handrail on a corner side of a rooftop, disposed on a bottom surface on an inside of the handrail of the rooftop, and having a part extending upward in parallel to the handrail;

a pair of handrail support parts extending horizontally from an upper part of the bottom support part toward the handrail, respectively; and a mounting part coupled to the upper part of the bottom support part and having a top configured for mounting the antenna device, wherein the bottom support part comprises:

a plurality of heavy object blocks;

a lower support part including a bottom support panel installed on the bottom surface of the rooftop so that the plurality of heavy object blocks are placed thereon, a border frame configured to form a border end part of the bottom support panel, and a diagonal connection frame cross-arranged to connect diagonal lines of the border frame; and an upper support part including a vertical support beam extending for a predetermined height from a crossing of the diagonal connection frame in a vertical direction in parallel to the handrail, and at least two inclined support beams each having a bottom connected to each middle part of the border frame and a top extending to be inclined from the bottom and connected to a middle part of the vertical support beam.

3. The mounting apparatus of claim 2, wherein the upper support part and the lower support part are coupled to each other in any one of a welding coupling method and a bolting coupling method.

4. The mounting apparatus of claim 2, wherein each of the plurality of heavy object blocks is provided with a metal material of 30 kg or less, and is able to be individually seated on an upper surface of the bottom support panel between the border frame and the diagonal connection frame.

5. The mounting apparatus of claim 2, wherein any one of the vertical support beam and the at least two inclined support beams is provided with a communicable inner space, and a wire installation port in which an external wire is inserted is formed on a bottom part of any one of the at least two inclined support beams.

6. The mounting apparatus of claim 2, wherein the pair of handrail support parts comprises at least two horizontal support beams horizontally extending from the middle part of the vertical support beam toward top parts of the handrail adjacent to each other, and extending from top parts of the inclined support beams.

7. The mounting apparatus of claim 6, wherein the pair of handrail support parts further comprises:

a seating panel part coupled to surround the top part of the handrail; and a vibration reduction part supported on an inner wall of the handrail.

8. The mounting apparatus of claim 7, wherein the at least two horizontal support beams are seated and coupled onto the seating panel part so that front end parts thereof support a weight of the seating panel part in a gravity direction.

9. The mounting apparatus of claim 7, wherein the seating panel part comprises:

a top seating panel configured to be seated on the top part of the handrail;

a handrail close contact panel extending to be bent from the top seating panel and configured to come in close contact with an outer wall of the handrail; and a handrail spacing panel extending to be bent from the top seating panel and disposed in parallel to be spaced apart for a predetermined distance from the inner wall of the handrail.

10. The mounting apparatus of claim 9, wherein the seating panel part further comprises a horizontal beam mounting rib formed integrally with the top seating panel and configured to seat and surround a part of a front end part of the horizontal support beam.

11. The mounting apparatus of claim 7, wherein the vibration reduction part comprises:

a clamping bolt fastened to horizontally penetrate the handrail spacing panel disposed to be spaced apart from the inner wall of the handrail in parallel;

a clamping nut assembled to the clamping bolt; and an elastic part provided on a front end part of the clamping bolt and configured to be elastically supported on the inner wall of the handrail.

12. The mounting apparatus of claim 11, wherein the elastic part is provided as a disc spring screw-fastened to a spring fastening hole provided on the front end part of the clamping bolt, a diameter of the disc spring becoming larger from a front end center of the clamping bolt as getting closer toward the handrail.

13. The mounting apparatus of claim 2, wherein the mounting part comprises:

a tilting means configured to tilt and rotate a top part of the antenna device coupled to a top part of the vertical support beam in forward and backward direction centered on a bottom part thereof; and a steering means configured to steer and rotate both left and right end parts of the antenna device coupled to the top part of the vertical support beam in left and right direction.

14. The mounting apparatus of claim 13, wherein the steering means comprises:

a steering mounting panel configured to mediate coupling of the antenna device to the vertical support beam and to be tilted in interwork with a tilting rotation of the antenna device in forward and backward direction by the tilting means;

a pair of left and right steering guide slots penetratingly formed along a predetermined steering rotation trajectory in up and down direction of the steering mounting panel; and a pair of left and right steering guide bolts configured to be fastened to a lower surface of the antenna device through penetrating lower parts of the pair of left and right steering guide slots.

15. The mounting apparatus of claim 14, wherein the steering mounting panel is coupled to the top part of the vertical support beam through the tilting means.

16. The mounting apparatus of claim 13, wherein the tilting means comprises:

a hinge-fixed tilting panel formed integrally with a lower surface of the steering mounting panel provided to mediate the coupling of the antenna device to the vertical support beam, and having a part configured to form a tilting rotation axis inside the vertical support beam;

a pair of tilting guide panels formed integrally with the lower surface of the steering mounting panel on both left and right sides of the tilting panel in parallel to the tilting panel; and a tilting adjustment bolt connected to a bottom part of the tilting panel and configured to adjust tilting of the tilting panel at a predetermined angle in forward and backward direction.

17. The mounting apparatus of claim 16, wherein worm wheel gear teeth are formed on an outer periphery of the bottom part of the tilting panel, and a part of the outer periphery of the tilting adjustment bolt is tooth-engaged with the worm wheel gear teeth; and wherein the tilting adjustment bolt is coupled to an inside of the top part of the vertical support beam horizontally in forward and backward direction.

18. The mounting apparatus of claim 16, wherein the tilting adjustment bolt is provided with a tilting adjustment part configured to be exposed to outside by penetrating the vertical support beam corresponding to an inner direction of the handrail, and wherein a tilting angle of the antenna device is adjusted in accordance with a rotation amount of the tilting adjustment bolt through the tilting adjustment part.

19. The mounting apparatus of claim 16, wherein the tilting means further comprises a tilting mounting panel formed with a tilting slot formed integrally with a top surface of the vertical support beam and penetrated by a bottom part of the tilting panel and a pair of tilting guide slots penetrated by a bottom part of the pair of tilting guide panels.

20. The mounting apparatus of claim 14, wherein a control box is further installed on a middle area of the vertical support beam, and wherein an optical cable that connects the control box and the antenna device with each other is configured to penetrate up and down the steering mounting panel and to be installed in a concealable manner from the outside by a concealing cover installed on a rear part of the antenna device.

* * * * *